United States Patent [19]
Kalin

[11] Patent Number: 4,759,430
[45] Date of Patent: Jul. 26, 1988

[54] ENERGY ABSORBING ARRANGEMENTS

[75] Inventor: Arthur Kalin, Einsiedeln, Switzerland

[73] Assignee: Werkzeugmaschinen-fabrik Oerlikon-Buhrle AG, Zurich, Switzerland

[21] Appl. No.: 944,765

[22] Filed: Dec. 22, 1986

[30] Foreign Application Priority Data

Jan. 14, 1986 [CH] Switzerland ................. 00110/86

[51] Int. Cl.⁴ .................. F16F 7/12; F16F 11/00; F41F 3/02; F41F 15/00
[52] U.S. Cl. ............................ 188/377; 89/1.701; 188/271
[58] Field of Search ............ 188/371, 374, 377, 381, 188/67, 129, 271; 89/1.701, 1.702; 74/492; 293/133, 136

[56] References Cited

U.S. PATENT DOCUMENTS

| | | | |
|---|---|---|---|
| 3,274,798 | 9/1966 | Wiggins, Jr. .................. | 188/371 X |
| 3,762,279 | 10/1973 | Zeyher .................. | 188/371 |
| 3,865,915 | 2/1975 | Saxl et al. .................. | 293/133 |
| 4,132,148 | 1/1979 | Meistring et al. .................. | 89/1.701 |
| 4,148,244 | 4/1979 | Schnäbele et al. .................. | 188/371 |
| 4,531,619 | 7/1985 | Eckels .................. | 188/371 |

FOREIGN PATENT DOCUMENTS

| | | | |
|---|---|---|---|
| 2352483 | 4/1975 | Fed. Rep. of Germany . | |
| 3102734 | 8/1982 | Fed. Rep. of Germany ..... | 89/1.701 |
| 2136106 | 3/1972 | France . | |
| 2284801 | 4/1976 | France . | |
| 577894 | 6/1946 | United Kingdom . | |
| 1228657 | 4/1971 | United Kingdom . | |
| 1410798 | 10/1975 | United Kingdom . | |
| 1073147 | 2/1984 | U.S.S.R. .................. | 74/492 |

Primary Examiner—Andres Kashnikow
Assistant Examiner—Richard Potosnak
Attorney, Agent, or Firm—Marmorek, Guttman & Rubenstein

[57] ABSTRACT

In e.g. a projectile launcher, an arresting sleeve (12) absorbs energy by deformation, which is necessary to arrest a piston (15) from which a counter-mass or a projectile is ejected. The counter-mass (17) should be dispersed as rapidly as possible on exit, in order not to endanger those in the vicinity of the gunner. According to the invention the arresting sleeve (12) has annular peripheral grooves (13,14) on its outer face and also on its inner face of equilateral triangular cross-section, and the piston (15) has a cartridge (16) holding the counter-mass (17), which at its forward end has a greater wall thickness than at its rearward end.

8 Claims, 1 Drawing Sheet

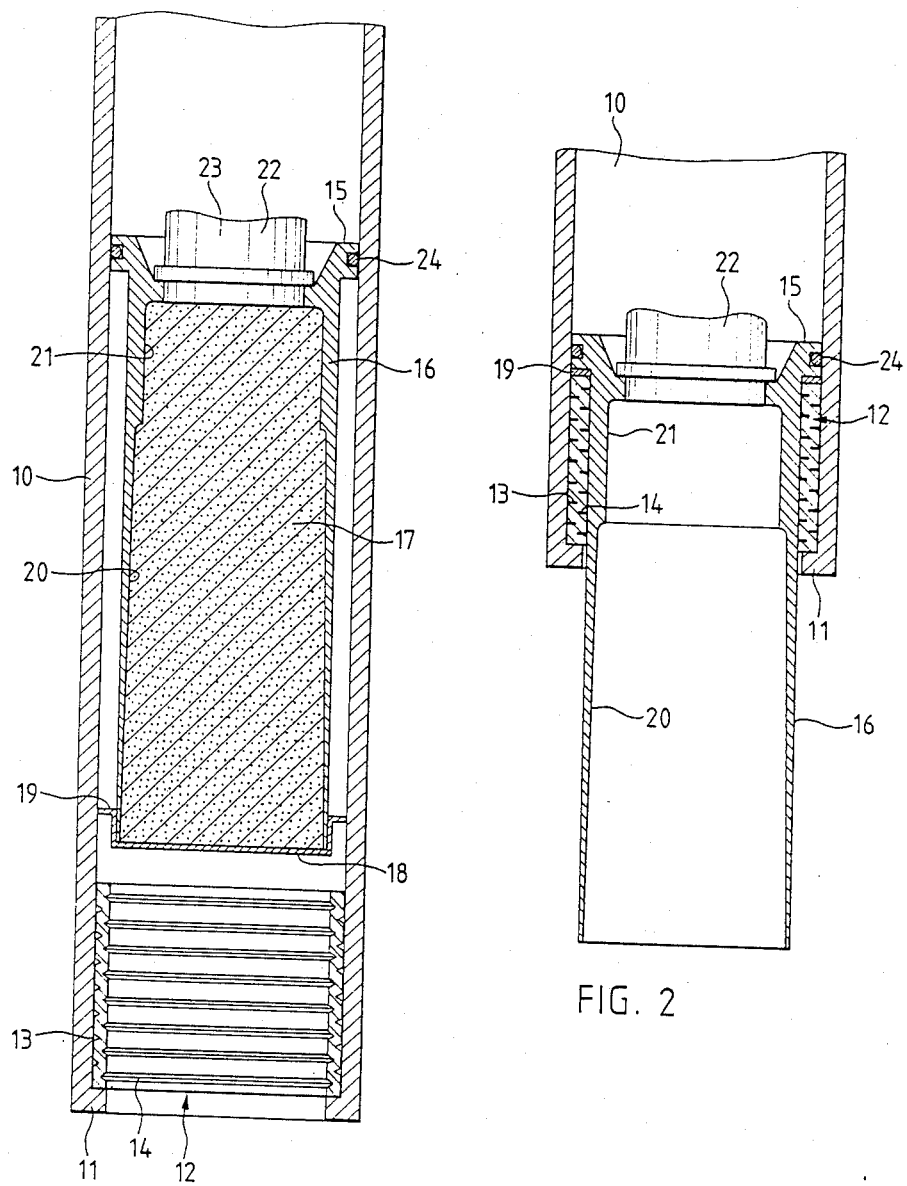

ENERGY ABSORBING ARRANGEMENTS

BACKGROUND TO THE INVENTION

The invention relates to energy absorbing arrangements.

In recoil-less discharge of projectiles from a barrel, it is known to eject a counter-mass rearwardly of the barrel by means of a free piston which is urged rearwardly of the barrel on firing the propellant charge. To prevent the piston itself ejecting from the barrel it is necessary to arrest it at the end of the barrel. An arresting sleeve is provided for this purpose.

Likewise, for flash-less discharge, a free piston is interposed between the charge and the projectile to contain the propellant gases. This piston also must be arrested before it leaves the barrel after the projectile.

DESCRIPTION OF THE PRIOR ART

An arrangement of this type is known (see DE-AS No. 2115770 and DE-AS No. 2651167 also FR-No. 7211387) for arresting a free piston driven with high acceleration in a barrel by means of plastic material deformation, especially in recoil-less weapons, having a deformable arresting sleeve fixed to the barrel wall on to which the accelerated free piston impinges. In this device the face of the free piston, on its side facing the arresting sleeve which is secured by bonding, has a concentric-concave depression formed over its whole cross-section. The arresting sleeve is formed with a starting bevel, to collapse inwardly in this depression.

Further, an inert counter-mass of good fragmentability is known (see DE-OS No. 2629282) for substantially recoil-less discharge devices, having a barrel for projectiles. This inert counter-mass comprises a material with internal strains, especially glass, which shatters on firing.

Those known arresting arrangements are not suitable for a barrel device with a counter-mass which is located in a sleeve which is not to be ejected rearwardly from the barrel and these known counter-masses are not suitable for a discharge device from which no fragments may be ejected rearwardly, which can be dangerous for those handling the weapon.

Among the problems to be solved by the present invention is to provide an arresting device which can be relied upon to arrest the free piston with the holder for the counter-mass without pieces flying out, which could endanger those using the weapon.

The invention comprises in one aspect an arresting sleeve for a piston in a barrel having peripheral grooves to facilitate lengthwise compression with consequent absorption of energy from the moving piston and increase in wall thickness which further arrests the piston by increased friction between piston and sleeve on the one hand and sleeve and barrel on the other.

The invention also comprises a device for discharging projectiles comprising a barrel holding piston means urged towards the end of the barrel, on firing the projectile, and an arresting sleeve in the barrel to arrest the piston, the sleeve having peripheral grooves to facilitate its lengthwise compression with consequent absorption of energy from the moving piston and increase in wall thickness which further arrests the piston by increased friction between piston and sleeve on the one hand and sleeve and barrel on the other.

The counter-mass may be contained in a cartridge on the piston. The cartridge may have an internally cylindrical portion adjacent the forward face of the piston and an outwardly flared portion facilitating ejection of the counter-mass. The cartridge may be closed by a cap which ruptures on discharge of the projectile. The counter-mass may comprise a powder, especially iron powder.

The piston means may comprise a piston which is located between a charge and a projectile and which is urged forwardly on discharge to be arrested by an arresting sleeve towards the forward end of the barrel.

The sleeve may have peripheral grooves on its inner and outer faces. The grooves on the inner face may lie axially intermediate the grooves on the outer face. They may be triangular in cross-section, preferably equilateral triangular.

BRIEF DESCRIPTION OF THE DRAWINGS

One embodiment of arresting sleeve and counter-mass according to the invention for a device for discharge of projectiles is described in more detail below with reference to the accompanying drawings, which show:

FIG. 1 a lengthwise section through the rearward end of a barrel with arresting sleeve and counter-mass, before the start of arresting the piston;

FIG. 2 the same lengthwise section through the rearward end of a barrel with arresting sleeve and counter-mass, after completion of the arresting of the piston.

DETAILED DESCRIPTION OF THE PREFERRED EMBODIMENTS

In FIG. 1 there is shown, of a device for recoil-less discharge of projectiles, only the rearward end of a barrel 10. This barrel 10 has at its rearward end a flange 11 on which an arresting sleeve 12 abuts. The external diameter of this arresting sleeve 12 corresponds substantially to the internal diameter of the barrel 10 so that the arresting sleeve 12 is an easy sliding fit in the barrel 10. This arresting sleeve 12 has on its outer face as well as its inner face peripheral grooves or notched grooves 13, 14. These peripheral grooves have preferably an equilateral triangular cross-section. For this arresting collar or arresting sleeve 12 a light metal is preferably used. By compression of the arresting sleeve 12 these peripheral grooves 13 and 14 close up—see FIG. 2. The larger the triangular cross-section of the peripheral grooves, the more the arresting sleeve 12 can be compressed. The size of the cross-section of the peripheral grooves 13, 14 is therefore so chosen that the effort required to deform the arresting sleeve is as great as possible.

If the peripheral grooves are too large, there is little material to be deformed, and if the peripheral grooves are too small, the extent of deformation is too short.

In front of the arresting sleeve 12 is a piston 15 slidable in the barrel 10, on which a cartridge 16 for holding a counter-mass 17 is fastened. This cartridge 16 is closed by a cover 18. This cover 18 has a rim 19 which contacts the inner face of the barrel 10 and serves to centre the cartridge 16. This cartridge 16 has a conical inner face 20 and also a cylindrical inner face 21, whereof the wall thickness in the region of the cylindrical inner face 21 is substantially greater than in the region of the conical inner face 20.

On the piston 15 is furthermore fixed a second cartridge 22 in which a charge 23 is located which on ignition drives the piston 15 into the position shown in FIG. 2, in which the part of the cartridge 16 with the greater wall thickness is in the region of the arresting sleeve 12. The piston 15 has, finally, a sealing ring 24.

The operation of the device described for recoil-less discharge of projectiles is as follows:

On firing the charge 23, the piston 15 is displaced by the pressure of the resulting explosive gases from the position shown in FIG. 1 to that shown in FIG. 2. In this displacement the rim 19 of the cover 18 is impacted against the arresting sleeve 12 and is as a result sheared off the cover 18 and finally clamped between the arresting sleeve 12 and the piston 15 (FIG. 2). The arresting ring 12 is thus compressed, so that the peripheral grooves 13 and 14 on the internal and external faces of the arresting sleeve are closed up. In addition the wall thickness of the arresting sleeve 12 is greatly increased, so that the arresting ring 12 is pressed against the outer face of the cartridge 16 as well as against the inner face of the barrel, whereby the movement of the piston 15 in the barrel 10 is arrested not only by the deformation of the arresting sleeve but also by friction between the outer face of the cartridge 16 and the inner face of the arresting sleeve 12, and the inner face of the barrel 10 and the outer face of the arresting sleeve 12. The large wall thickness in the region of the cylindrical interior wall 21 of the cartridge 16 ensures that the cartridge 16 will not be torn free from the piston 15 and fly out. Through the high acceleration of the piston 15 on firing the charge 23 and the correspondingly large deceleration by driving the piston 15 against the arresting sleeve 12, the cover 18 flies off and the counter-mass 17 is ejected. For this counter-mass 17 a powder, e.g. iron powder, is preferably used.

The length over which the arresting takes place is, as explained, determined by the sum of the widths of the peripheral grooves 13 and 14, as well as by the increase in wall thickness of the arresting sleeve 12.

At the front end, at the same time, a projectile (not shown) is ejected forwardly by the charge, whereby the recoil-less operation of the whole discharge device is ensured, so far as the weights of the projectile and counter-mass are correctly correlated. Between projectile and charge is provided a second piston which is arrested at the forward end of the barrel 10 in the same manner as the piston 15 is arrested, so that the explosive gases cannot escape from the barrel 10. The ejected counter-mass 17 should be dispersed as rapidly as possible in order not to put people at risk in the region directly behind the gunner. Because of the conical inner face 20, a faster ejection of the counter-mass as well as its rapid dispersion is ensured.

For flash-free discharge without recoil-less discharge the second piston and arresting sleeve at the forward end of the barrel can be used without the piston 15 and counter-mass 10.

The arresting sleeve will also serve to arrest free pistons and absorb energy in situations other than a projectile-firing situation.

I claim:

1. A recoil-less projectile launcher comprising:
a barrel,
piston means in the barrel urged toward one end of the barrel on firing the projectile,
the piston means having at least a portion of lesser external diameter than the internal diameter of the barrel, so as to leave an annular space therebetween,
an arresting sleeve located in the barrel,
means locating the sleeve in the barrel against axial movement therealong away from the piston,
said sleeve having an outer diameter substantially equal to the inner diameter of the barrel, and an internal diameter substantially equal to the outer diameter of the piston so that the piston can enter the sleeve,
the sleeve having peripheral grooves to facilitate lengthwise compression thereof with consequent absorption of energy from the piston,
the sleeve being adapted on compression to increase its wall thickness,
increase in the wall thickness of the sleeve being such as to increase frictional force between the collapsing sleeve and the barrel on the one hand and the sleeve and the piston on the other hand,
the piston being urged rearwardly of the barrel on firing,
counter-mass means arranged to be ejected rearwardly of the barrel on arrest of the piston,
cartridge means on said piston,
said counter-mass being arranged in said cartridge,
said cartridge means having a rear opening, from which the counter-mass can be ejected on arrest of the piston,
said cartridge means including a rearwardly diverging inner wall facilitating ejection of the counter-mass,
said counter-mass comprising iron powder.

2. A launcher according to claim 1, said cartridge means having
an internally cylindrical portion forward of said rearwardly diverging inner wall and adjacent the piston.

3. A launcher according to claim 2, comprising
cap means closing the cartridge at its rearward end, remote from the piston
said cap means being rupturable on launch of the projectile to release the counter-mass means.

4. Apparatus according to claim 1, said sleeve having peripheral grooves on its inner and outer faces.

5. Apparatus according to claim 1, said sleeve having axially spaced apart peripheral grooves on its outer face and grooves on its inner face axially intermediate the outer face grooves.

6. Apparatus according to claim 1, said sleeve having triangular cross-section peripheral grooves.

7. Apparatus according to claim 1, said sleeve having peripheral grooves of equilateral triangular cross-section.

8. A counter-mass arrangement according to claim 1, said cartridge means comprising a cylindrical inner wall portion connected to said rearwardly diverging inner wall, the latter being rearwardly of the cylindrical wall portion.

* * * * *